Figure 1:
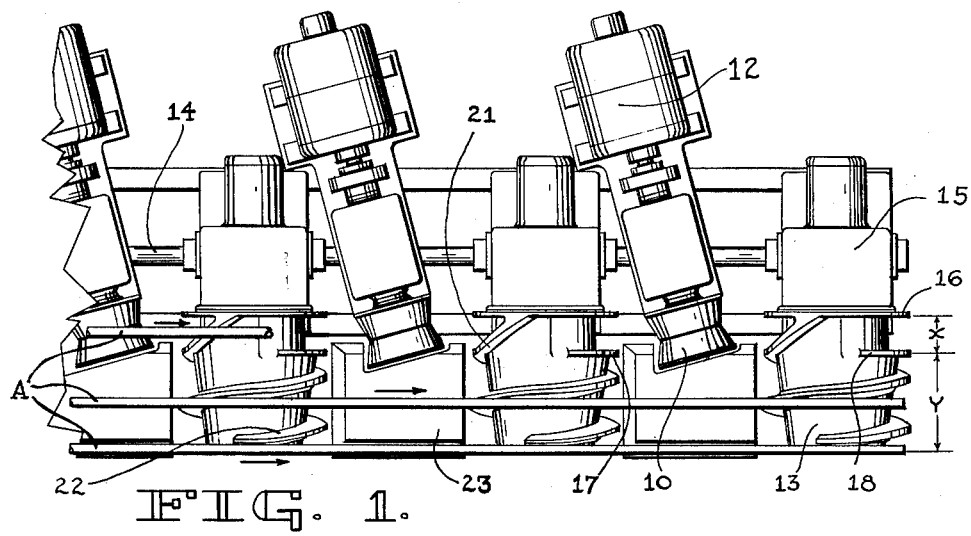

Sept. 1, 1953  S. FINDLATER  2,650,694
KICKOUT DEVICE
Filed Dec. 26, 1950

INVENTOR.
STEVENSON FINDLATER
BY Donald G. Dalton
Attorney

Patented Sept. 1, 1953

2,650,694

UNITED STATES PATENT OFFICE 2,650,694

KICKOUT DEVICE

Stevenson Findlater, Pittsburgh, Pa., assignor to United States Steel Corporation, a corporation of New Jersey Application December 26, 1950, Serial No. 202,587

9 Claims. (Cl. 198—104)

1

This invention relates to improved kick-out devices for removing articles laterally from conveyors.

Although the invention is not limited to use in any particular environment nor for handling any particular articles, it is especially suited for use in butt-weld pipe mills for removing cut lengths of pipe from a transfer conveyor to a cooling table. In such mills pipe continuously emerges from a forming and welding means at temperatures in excess of 2000° F. while traveling longitudinally at a rate on the order of 1000 feet per minute. A flying saw or shear cuts the pipe to the required lengths, which then continue to travel longitudinally over a roller conveyor, which has a run-out section, an accelerating section, and a transfer section. The accelerating section of the conveyor increases the speed of the cut lengths to a rate on the order of 1200 feet per minute, which is sufficient to produce gaps between successive lengths. These pipe lengths, now somewhat separated, move to the transfer section of the conveyor, from which a kick-out device removes them laterally to a cooling table. The kick-out device must be capable of removing the cut lengths very expeditiously, inasmuch as the gaps between successive pipe lengths are relatively short and each length must be clear of that portion of the conveyor in which the kick-out device functions before the next length enters.

An object of the present invention is to provide an improved combination of a roller conveyor and a kick-out device which can receive pipe lengths cut from a continuous pipe and traveling at high speed, remove these lengths transversely of the conveyor, and space them apart.

A further object of the invention is to provide improved kick-out devices which are capable of clearing articles from conveyors in very brief periods and at the same time are continuously driven, thus avoiding the difficulties of intermittent operation.

A further object of the invention is to provide improved kick-out devices which are readily synchronized with a conveyor to lift an article therefrom and move it sidewise after each article has reached a predetermined location longitudinally on the conveyor.

A further object of the invention is to provide improved kick-out devices comprising a series of power-driven rolls, each of which includes a cam for lifting articles from a conveyor at the proper moment in the operating cycle and a helical flange for moving the lifted article sidewise.

2

A further object is to provide, as a subcombination, an improved kick-out roll which includes a lifting cam and a helical flange.

Figure 2:
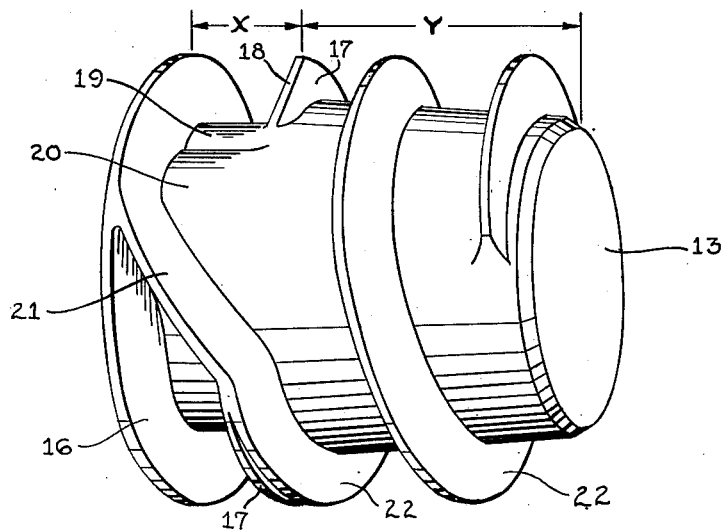

In accomplishing these and other objects of the invention, I have provided improved details of structure, a preferred form of which is shown in the accompanying drawing, in which:

Figure 1 is a top plan view of a portion of a roller conveyor which is equipped with an improved kick-out device embodying features of the present invention; and Figure 2 is a perspective view on a larger scale of one of the kick-out rolls which the device comprises.

Figure 1 shows a conveyor which is composed of a series of conveyor rolls 10 and individual drive motors 12. The rolls convey an article A, for example a pipe length, in a path from left to right. I intend the term "path" to refer to the space which the article normally occupies on the conveyor. The conveying surfaces of the rolls are shown slightly dished, and the axes of the rolls are shown oblique to the longitudinal axis of the article. This construction enables the conveyor to rotate the articles slowly about their axis, for example to promote uniform cooling. The articles rotate in the direction of their subsequent transverse movement (i. e. clockwise as viewed from the left in Figure 1). Consequently the rotation overcomes the possibility of an article's jumping away from the kick-out rolls, but instead assists the kick-out rolls in moving the article in the intended direction. It is to be understood, however, that the specific conveyor and articles shown are only exemplary and that the device of the present invention could be used with other conveyor constructions and for handling other types of articles.

The device of the present invention comprises a series of power-driven kick-out rolls 13 which are situated intermediate the conveying means. In the present example the kick-out rolls alternate with the conveyor rolls 10, but other arrangements would be possible. Also in the present example the length of the individual pieces of pipe governs the number of kick-out rolls. The number must be sufficient to lift uniformly from the conveyor rolls the longest length of pipe which the conveyor handles, but only the longest lengths travel the full length of the conveyor. The kick-out rolls preferably are driven from a common drive shaft 14, to which each is connected through any suitable gearing situated within housings 15. The kick-out rolls rotate on axes below the path of articles on the conveyor and in the same direction as the conveyor rolls, but at a much slower speed, as hereinafter explained. All the kick-out rolls rotate at the same speed and are of like construction and all bear the same phase relation.

The portion of each kick-out roll 13 directly under the path of articles A on the conveyor rolls 10 is designated X. This portion of each kick-out roll is bounded by an end flange 16 and an intermediate flange 17. The end flange is continuous, but the intermediate flange has a gap 18. These flanges assist in guiding the articles as long as they are on the conveyor and thus retain them thereon against any tendency to jump sidewise.

Through its portion X each roll has a concentric arcuate segment 19, a cam segment 20, and a short helical flange 21 of high pitch. The concentric segments 19 clear articles on the conveyor, since they are below the path of such articles. Therefore as long as these segments are opposite an article, the conveyor rolls 10 can advance the article longitudinally. The cam segments extend from below the article path to above this path. Therefore, when the kick-out rolls rotate to a position where their cam segments 20 are opposite the article, the kick-out rolls lift the article from the conveyor rolls. On further rotation of the kick-out rolls, their helical flanges 21 push the article sidewise through gaps 18 away from its path on the conveyor rolls.

The other portion of each kick-out roll, which is situated to one side of the article path is designated Y. Here the roll can be cylindrical or, if it is desired to raise or lower the articles slightly, the roll can taper in either direction. The roll carries a helical flange 22 which forms a continuation of flange 21, but is of somewhat lesser pitch. Portions Y of the rolls receive each article from portions X of the rolls. Flanges 22 move and guide the articles outwardly. Ultimately the kick-out rolls discharge the articles from their far end, for example to a cooling table.

A typical kick-out roll constructed in accordance with the present invention has a diameter of 12½ inches. The concentric segment 19 occupies about 300° of the circumference and the cam segment 20 about 60°. The helical flange 21 has a pitch on the order of 40 inches and the helical flange 22 a pitch on the order of 6 inches. These dimensions are to be considered as exemplary only and in no sense limiting.

A series of frictional stop plates 23 are suitably supported intermediate the portions Y of the kick-out rolls. An atricle travels rapidly on the conveyor rolls, but as soon as the kick-out rolls lift it, they tend to slacken its speed. When the article reaches its portions Y, it rests either entirely or partially on these friction plates. The combined action of the kick-out rolls and the plates limits the longitudinal speed of the articles either to the slow movement which the kick-out rolls impart or else stops longitudinal movement altogether. These plates can be hinged to their supporting structure so that their inclination and retarding effect on articles can be varied.

It follows that the speed and phase position of the kick-out rolls must be synchronized with the conveyor, and in the present example with the flying shear which cuts the continuous pipe into lengths. The speed ratio between the kick-out rolls and the conveyor rolls is such that the concentric segment 19 of the former remains opposite an article on the latter until the article moves the full length of the series of conveyor rolls. Thus the kick-out rolls rotate only a portion of one revolution while the conveyor rolls rotate a sufficient number of revolutions to move the article the desired distance. Next the kick-out roll rotates sufficiently to lift and remove the article sidewise of its path on the conveyor before the succeeding article reaches the conveyor. Thus the kick-out roll must rotate a smaller portion of a revolution before the next article feeds to the conveyor rolls. Any standard or desirable means can be employed for properly adjusting these speeds.

From the foregoing description it is seen that the present invention affords a simple and highly practical kick-out device for removing articles sidewise from conveyors. The device embodies power driven kick-out rolls which rotate continuously and which readily are synchronized with the conveyor so that they remove the articles very expeditiously and at the proper time in the operating cycle.

The device is capable of stopping the articles which are traveling at high speeds and getting these articles out of the way of articles which follow without any likelihood of articles piling up on each other.

While I have shown and described only a preferred embodiment of the invention, it is apparent that modifications may arise. Therefore, I do not wish to be limited to the disclosure set forth but only by the scope of the appended claims.

I claim:

1. The combination, with a conveyor which includes article supporting means adapted to move articles in a path, of a kick-out device comprising a series of rolls supported intermediate said article supporting means and below the level thereof, a cam on each of said rolls under the path of articles on said supporting means for lifting articles therefrom, a helical flange on each of said rolls for shifting lifted articles sidewise of this path, and drive means for continuously rotating said rolls.

2. In combination with a conveyor, a kick-out device comprising a series of rolls, each of which has a first portion directly under the path of articles on said conveyor and a second portion to one side of this path, a lifting cam and a helical flange of high pitch on the first portion of each roll for lifting articles from the conveyor and shifting them sidewise, a helical flange of less pitch on the second portion of each roll forming a continuation of said first named flange for receiving articles from said first portion and further shifting them sidewise, and drive means for continuously rotating said rolls.

3. In combination with a conveyor, a kick-out device comprising a series of rolls which are similarly constructed and have the same phase relation, each of said rolls having a first portion directly under the path of articles on said conveyor and a second portion to one side of this path, each of said rolls in its first portion having a relatively long arcuate segment adapted to clear articles on the conveyor, a cam segment adapted to lift articles therefrom and a helical flange of high pitch adapted to shift lifted articles sidewise, each of said rolls in its second portion having a helical flange of less pitch forming a continuation of said first named helical flange for receiving articles from said first portion and further shifting them sidewise, and drive means for continuously rotating said rolls.

4. In combination with a conveyor, a kick-out device comprising a series of rolls which are similarly constructed and have the same phase relation, each of said rolls having a first portion directly under the path of articles on said conveyor and a second portion to one side of this path, guide flanges bounding the ends of said first portion, the flange between said portions having a gap, each of said rolls in its first portion having a relatively long arcuate segment adapted to clear articles on the conveyor, a cam segment adapted to lift articles therefrom and a helical flange of high pitch adapted to shift lifted articles sidewise through said gap, each of said rolls in its second portion having a helical flange of less pitch forming a continuation of said first named helical flange for receiving articles from said first portion and further shifting them sidewise, and drive means for continuously rotating said rolls.

5. In combination with a conveyor, a kick-out device comprising a series of rolls, each of which has a first portion directly under the path of articles on said conveyor and a second portion to one side of this path, means on the first portion of each roll for lifting articles from the conveyor, means also on the first portion of each roll for shifting lifted articles sidewise, means on the second portion of each roll for receiving articles from the first portion and further shifting them sidewise, stop means intermediate the second portions of said rolls for retarding movement of articles in the direction of their path on the conveyor, and drive means for continuously rotating said rolls.

6. In combination with a conveyor, a kick-out device comprising a series of rolls, each of which has a first portion directly under the path of articles on said conveyor and a second portion to one side of this path, means on the first portion of each roll for lifting articles from the conveyor, means also on the first portion of each roll for shifting lifted articles sidewise, means on the second portion of each roll for receiving articles from the first portion and further shifting them sidewise, a series of stop plates intermediate the second portions of said rolls and adapted to frictionally contact articles thereon for retarding their movement in the direction of their path on the conveyor, and drive means for continuously rotating said rolls.

7. In combination with a conveyor, a kick-out device comprising a series of rolls which are similarly constructed and have the same phase relation, each of said rolls being rotatable on an axis below the path of articles on said conveyor and having a first portion directly under this path and a second portion to one side thereof, flanges bounding the ends of said first portion, the flange between said portions having a gap, each of said rolls in its first portion having a relatively long arcuate segment adapted to clear articles on the conveyor, a cam segment adapted to lift articles therefrom and a helical flange of high pitch adapted to shift lifted articles sidewise through said gap, each of said rolls in its second portion having a helical flange of less pitch for receiving articles from said first portion and further shifting them sidewise, a series of stop plates intermediate the second portions of said rolls and adapted to frictionally contact articles thereon for retarding their movement in the direction of their path on the conveyor, and drive means for continuously rotating said rolls.

8. A kick-out roll including a first portion the periphery of which has a relatively long arcuate segment, a cam and a helical flange of high pitch between said cam and said arcuate segment, and a second portion at one side of said first portion and the periphery of which has a helical flange of less pitch forming a continuation of said first named helical flange.

9. A kick-out roll including a first portion the periphery of which has a relatively long arcuate segment, a cam and a helical flange of high pitch between said cam and said arcuate segment, flanges bounding the ends of said first portion, one of which has a gap, and a second portion at one side of said first portion beyond the flange which has the gap, the periphery of said second portion having a helical flange of less pitch forming a continuation of said first named helical flange.

STEVENSON FINDLATER.

References Cited in the file of this patent

UNITED STATES PATENTS

| Number | Name | Date |
|---|---|---|
| 729,580 | Hartmann | June 2, 1903 |
| 1,626,734 | Hunt | May 3, 1927 |